United States Patent [19]

Mesnel et al.

[11] Patent Number: 4,970,828
[45] Date of Patent: Nov. 20, 1990

[54] GUIDING AND SEALING SYSTEMS FOR MOVABLE WINDOWS OF AUTOMOBILE DOORS

[75] Inventors: François Mesnel, Neuilly-Sur-Seine; Gérard Mesnel, Carrieres-Sur-Seine, both of France

[73] Assignee: Establissements Mesnel, Carrieres-sur-seine, France

[21] Appl. No.: 457,324

[22] Filed: Dec. 27, 1989

[30] Foreign Application Priority Data

Dec. 28, 1988 [FR] France .................. 88 17313

[51] Int. Cl.⁵ ................................. E05F 11/38
[52] U.S. Cl. .................... 49/374; 49/440; 49/502
[58] Field of Search ............ 49/374, 375, 441, 440, 49/502

[56] References Cited

U.S. PATENT DOCUMENTS

| | | | |
|---|---|---|---|
| 4,240,227 | 12/1980 | Hasler et al. | 49/374 |
| 4,490,942 | 1/1985 | Arnheim et al. | |
| 4,553,354 | 11/1985 | Barbero | 49/441 |
| 4,567,691 | 2/1986 | Warner | 49/374 |
| 4,608,779 | 9/1986 | Maeda et al. | 49/374 |
| 4,611,435 | 9/1986 | Warner | 49/374 |
| 4,628,637 | 12/1986 | Okada | |
| 4,823,511 | 4/1989 | Herliczek et al. | 49/374 |
| 4,843,763 | 7/1989 | Mesnel et al. | |
| 4,875,307 | 10/1989 | Barbero | 49/374 |

*Primary Examiner*—Gary L. Smith
*Assistant Examiner*—Michael J. Milano
*Attorney, Agent, or Firm*—Scully, Scott, Murphy & Presser

[57] ABSTRACT

The disclosure relates to a system for the guiding and sealing of a movable window of an automobile door, especially of a flush window, comprising a profiled section (7) made from a reinforced elastomer, a first part (9) of which is capable of being secured to the window frame, whereas a second part (10) ensures the guiding and sealing of the movable window (4). According to the disclosure, a rectilinear part of the profiled section, adjacent to the center pillar of the body, is equipped with a slide (13), whereas the movable window has, on the lateral part of its outer face adjacent to the center pillar, at least at the upper part of this face, a guide shoe (12) engaged in this slide (13) and capable of sliding in this slide during the entire displacement of the movable window.

3 Claims, 1 Drawing Sheet

GUIDING AND SEALING SYSTEMS FOR MOVABLE WINDOWS OF AUTOMOBILE DOORS

The present invention relates to improvements made to the guiding and sealing systems for movable windows of automobile doors, especially of flush windows.

It is known that, in order to enhance the aerodynamic qualities of automobiles, increasing use is made of so-called flush windows, which move substantially in the extension of the outer metal panel of the automobile doors.

In order to ensure the guiding and sealing of these windows, use is made customarily of profiled sections made from an extruded elastomer containing a metal reinforcement, a first part of which, with a U-shaped cross section forming a gripping element, is intended to be fixed to a rabbet of the frame of the movable window, whereas a second part known as a "run", with a cross section in the form of a U which is inverted relative to the abovementioned part, serves as a guiding and sealing member for the movable window. Between these two parts, a third part, adjoining the first part and likewise having a cross section in the form of a U which is inverted relative to that of this first part, may optionally be provided in order to receive an auxiliary sealing profiled section of the type known as a licker, so called because at least one lip licks the outer face of the window in the closed position of the latter. The licker may also be an integral part of the guiding and sealing profiled section.

In order to enhance the sealing and flexibility of this profiled section, the Applicant proposed, in its French Patent Application No. 86/03,886 and in its Application for Certificate of Addition No. 87/16,334, to provide in the base of the U of the second part a portion which has no metal reinforcement and forms a flexible hinge made from elastomer. Improved sealing at the end of travel of the movable window is thus obtained The present invention relates to the guiding and sealing systems for a flush movable window which are equipped with profiled sections of this type or with profiled sections performing similar functions, and its object is to improve the guiding of the movable window over substantially the major part of its displacement and, more particularly, at the end of travel, when it reaches its closed position.

To this end, the invention proposes to equip the rectilinear part of the profiled section, adjacent to the center pillar of the body, with a member forming a slide, in which there is engaged a guide shoe arranged on the outer face of the movable window, at least at the upper part of the latter.

The subject of the invention is therefore a system for the guiding and sealing of a movable window of an automobile door, especially of a flush window, comprising a profiled section made from a reinforced elastomer, a first part of which is capable of being secured to the window frame, whereas a second part ensures the guiding and sealing of the movable window, characterized in that a rectilinear part of the profiled section, adjacent to the center pillar of the body, is equipped with a slide which has a flange retained in grooves in the part of the profiled section, whereas the movable window has, on the lateral part of its outer face adjacent to the center pillar, at least at the upper part of this face, a guide shoe engaged in this slide, the shapes of the shoe and the slide being such that the shoe is capable of sliding in this slide during the entire displacement of the movable window while being held therein.

The movable window will thus be guided by the guide shoe, with which it is fitted, over the entire length of its displacement and, in particular, when it reaches its top position corresponding to the closure of the door opening.

One embodiment of the invention will be described below in detail with reference to the accompanying drawings This embodiment concerns a profiled section of the type described in the abovementioned applications for a patent and certificate of addition, but it will be clear to a person skilled in the art that such an application is of a nonlimiting nature and that the invention can be used with other types of profiled sections by making simple modifications within the capability of a person skilled in the art.

Figure 1:
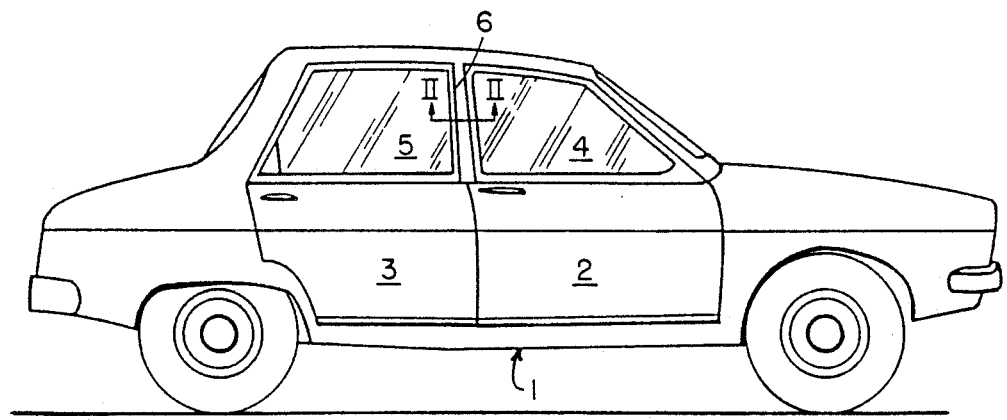
FIG. 1 shows an automobile with four doors equipped with sliding windows.

The automobile 1 shown in FIG. 1 is an automobile with four doors 2, 3, each fitted with a sliding window 4, 5, the guiding and sealing of which are ensured, at its upper part and along its lateral sides, by a profiled section made from an elastomer of the type described in the abovementioned patent applications.

Figure 2:
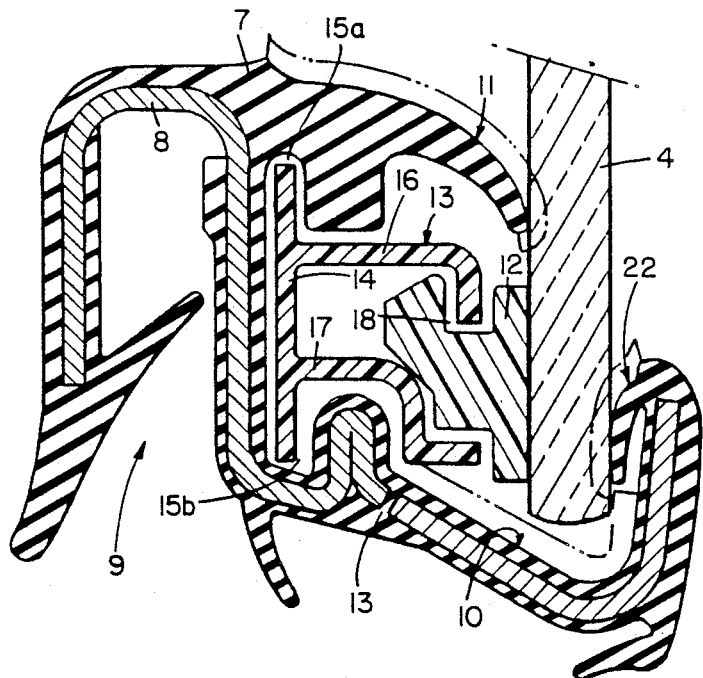
FIG. 2 is a partial cross section, on a larger scale, of the profiled section and the window, along the line II—II of FIG. 1.

The parts of this profiled section and of the windows which are of interest in the present invention are those which are adjacent to the center pillar 6 and which are shown on a large scale in FIG. 2.

As shown in this FIG. 2, where, for greater clarity, the clearances between the various members have been exaggerated, the profiled section consists of an extruded elastomer 7 on a metal reinforcement 8 which is embedded in this elastomer over the major part of its cross section.

This profiled section comprises a part 9 with a U-shaped cross section, forming a gripping element intended to cover a frame of the body in order to be secured thereto, and a second part 10 known as a "run", adjoining the abovementioned part and with a cross section in the form of a U which is inverted relative to the latter. This run 10 ensures the guiding and sealing of the movable window 4 and, for this purpose, comprises a flexible lip 11 or licker, which folds back on contact with the window 4 and licks the outer surface of the latter, and a flexible inner lip 22, which likewise folds back on contact with the window and presses against the inner face of the latter.

As described in the aforementioned patent applications, the reinforcement 8 is sectioned at the base of the U of the run 10 to form a resilient hinge 13.

According to the invention, the window 4 is equipped, on its outer face, at the upper part of its lateral edge adjacent to the center pillar 6, with a guide shoe 12 which cooperates with a slide 13, integral with the profiled section, in order to ensure the guiding of the window in the course of its displacement.

The slide 13 comprises a flange 14 parallel to the center pillar 6 and the ends of which are engaged by retention in grooves 15a and 15b in the profiled section. Two branches 16 and 17 project perpendicularly to the flange 14 in the direction of the window 4 and, between these branches, is engaged the shoe 12. To be more precise, the shoe 12 has a lateral groove 18, forming a slide for the curved end of the branch 16, whereas the branch 17 has a lateral profile complementary to that of the shoe so as to guide it laterally.

The window 4 is thus guided perfectly during its entire upward movement toward the top of the window frame and, in particular, at the end of its movement, when it comes into contact with the part of the profiled section arranged at the upper part of this frame.

The slide 13 and the shoe 12 may, of course, be of absolutely any shape, the only requirement being that the shoe 12 is able to slide in the slide in the course of the entire displacement of the window 4 and that the slide exhibits an undercut which holds the shoe in this slide. These members may be made from any material suitable for their use, for example polyethylene for the slide 13 and Nylon (trademark) for the shoe 12.

As already indicated, the structure of the profiled section is not limiting and the system according to the invention encompasses any profiled section capable of being secured to a window frame and of ensuring the guiding and sealing of a movable window.

We claim:

1. System for the guiding and sealing of a movable window of an automobile door, especially of a flush window, comprising a profiled section (7) made from a reinforced elastomer, a first part (9) having means for securement to the window frame, whereas a second part (10) ensures the guiding and sealing of the movable window (4), wherein a rectilinear part of the profiled section, adjacent to a center pillar (6) of the body, is equipped with a slide (13) which has a flange (14) retained in grooves (15a, 15b) in the part (10) of the profiled section, wherein the movable window has mounted thereto, on the lateral part of its outer face adjacent to the center pillar, at least at the upper part of this face, a guide shoe (12), engaged in the slide (13), the shapes of the shoe and the slide being such that the shoe is capable of sliding in this slide during the entire displacement of the movable window while being held therein.

2. System according to claim 1, wherein the slide (13) has two parallel branches (16, 17) between which the shoe (12) is engaged.

3. System according to claim 2, wherein a curved end of one (16) of said branches is engaged in a lateral groove (18) in the shoe (12), wherein the other branch (17) corresponds in shape to the side of the shoe (12).

* * * * *